Patented Sept. 3, 1935

2,013,066

UNITED STATES PATENT OFFICE 2,013,066

HYDROCARBON DECOMPOSITION AND CATALYST THEREFOR

Frank Porter, Syracuse, N. Y., assignor to Atmospheric Nitrogen Corporation, New York, N. Y., a corporation of New York No Drawing. Application June 24, 1930, Serial No. 463,462

14 Claims. (Cl. 23—212)

This invention relates to a process and catalyst for the dehydrogenation of carbon compounds. More particularly, this invention relates to the production of hydrogen by the reaction of a hydrocarbon and water vapor in the presence of a catalyst and to materials adapted to catalyze this reaction.

It has heretofore been proposed to react a hydrocarbon and water vapor in the presence of a catalyst to produce hydrogen, carbon dioxide and carbon monoxide. For example, U. S. P. 1,128,814 discloses the treatment of a hydrocarbon, such as methane or gases containing methane with a nickel catalyst. In carrying out the process described in this patent, the reaction between methane, for example and water vapor, takes place mainly in accordance with the following equation:

$$CH_4 + H_2O = CO + 3H_2$$

The hydrogen thus produced is accompanied by a relatively large amount of carbon monoxide. The carbon monoxide may in large part react with steam in accordance with the equation:

$$CO + H_2O = CO_2 + H_2$$

and after removal of the residual unreacted carbon monoxide, a hydrogen gas suitable for use in commercial operations, such as ammonia synthesis, is obtained. The process as described, however, requires two separate catalytic treatments of the hydrocarbon employing different catalysts for each step.

It has also been proposed to produce hydrogen from a hydrocarbon, such as methane, and water vapor, in the presence of a catalyst by a process in which reaction between the hydrocarbon and water vapor, forms hydrogen and carbon dioxide in accordance with the equation $$CH_4 + 2H_2O = CO_2 + 4H_2$$

together with a minor amount of carbon monoxide.

It is an object of this invention to provide a highly active catalyst adapted to promote the reaction between a hydrocarbon and steam. Another object of this invention is to provide a catalyst sufficiently active for promoting this reaction at temperatures below 750° C. which may be prepared in a simple, expeditious and economical manner. An additional object of this invention is to provide a catalyst adapted for the simultaneous catalysis of the reaction of water vapor with a hydrocarbon and carbon monoxide in a gas containing the same with the production of hydrogen and carbon dioxide. Further objects of this invention are to provide an active catalyst for the above reactions which retains its activity after relatively long periods of use and a process for the production of hydrogen by the catalytic decomposition of a hydrocarbon with water vapor employing the new catalysts of this invention. Other objects of the invention will in part be obvious and will in part appear hereinafter.

I have discovered that a catalyst consisting of nickel, preferably deposited on a carrier, is an active rugged catalyst for the reaction between a hydrocarbon such as methane and water vapor to form hydrogen at temperatures below about 750° C. when the nickel has been precipitated in a basic medium, preferably one having a high hydroxyl ion concentration. In carrying out this invention a hydrocarbon gas, such as natural gas which consists principally of methane, a gas obtained by the distillation of bituminous coal to form coke, coal gas or water gas made from bituminous coal and water vapor, such gases preferably being substantially free from sulfur, together with water vapor, are brought into contact with a catalyst comprising nickel precipitated in a basic medium. The invention further comprises the several steps and the relation of one or more of such steps with respect to each of the others and the catalysts possessing the features and properties which are exemplified in the following detailed disclosure and the scope of the invention will be indicated in the claims.

For a fuller understanding of the nature and objects of the invention, reference should be had to the following detailed description for the production of a catalyst and for the production of hydrogen by the decomposition of hydrocarbon and water vapor in the presence of a catalyst in accordance with this invention.

In the following examples which are presented as illustrative embodiments of methods of producing the catalyst material in accordance with this invention, the parts are given by weight, and with respect to salts on an anhydrous basis.

*Example I.*—To 75 parts of calcined magnesite add a solution of 27 parts of sodium hydroxide and 500 parts of water. Heat this mixture to the boiling point and add slowly with stirring 62.5 parts of nickel nitrate dissolved in 150 parts of water. Filter the resulting mixture, wash thoroughly with distilled water, and dry at 110° C. The dried material is compressed into tablets which are placed in a vessel and heated in a stream of hydrogen free from deleterious impurities to a temperature of about 350° C. for one hour. The catalyst thus prepared consists of nickel precipitated in a basic medium on magnesia as a carrier in the proportions of about 50 parts of magnesium calculated as MgO to every 18 parts of nickel calculated as NiO. It may be employed for catalyzing the reaction between a hydrocarbon and water vapor at a temperature of about 550° C. The calcined magnesite employed in the production of this catalyst and of other catalysts described below, was a high grade commercial product.

*Example II.*—To 75 parts of powdered magnesia add 27 parts of sodium hydroxide dissolved in 500 parts of water. Heat the mixture to boiling and add 43.5 parts of nickel chloride dissolved in 150 parts of water. Filter the resulting precipitate, wash thoroughly with distilled water and dry. The dried material is tableted, and after being reduced in hydrogen at about 350° C., may be employed at a temperature of about 600° C. for the catalytic decomposition of a hydrocarbon and water vapor. The catalyst thus prepared contains a small amount of chlorides which apparently have a beneficial effect upon the activity of the catalyst.

*Example III.*—Add 75 parts of powdered calcined magnesite to 36 parts of sodium carbonate dissolved in 500 parts of water. Bring the mixture to the boiling point and add slowly with stirring 62.5 parts of nickel nitrate dissolved in 150 parts of water. Filter the resulting mixture and wash thoroughly with distilled water. Dry the material from the filter at 110° C. and compress into tablets. The tablets thus prepared may be filled into a converter and after reduction with hydrogen at 350° C., as described in Example I, may be employed at temperatures of between about 500° and 600° C. for the decomposition of a hydrocarbon and steam.

*Example IV.*—Add 75 parts of powdered magnesium fluoride to 36 parts of sodium carbonate dissolved in 500 parts of distilled water. Heat the mixture to the boiling point and add 62.5 parts of nickel nitrate dissolved in 100 parts of water. Filter the resulting mixture and wash thoroughly with distilled water. Dry the material from the filter at 100° C. and compress into tablets. The tablets are employed for the decomposition of a hydrocarbon and steam after reduction in hydrogen as described in Examples I and II.

*Example V.*—Add 75 parts of magnesia to 27 parts of sodium hydroxide dissolved in 500 parts of water. Heat the mixture to the boiling point and add 62.5 parts of nickel nitrate and 20 parts of ortho-phosphoric acid in 100 parts of water. Filter the resulting mixture, wash thoroughly with distilled water and dry the material from the filter. The dried material is formed into tablets, and reduced and employed as in Example I for the decomposition of a hydrocarbon and water vapor.

*Example VI.*—Add 75 parts of powdered magnesia to 54 parts of sodium hydroxide dissolved in 500 parts of water. Heat the mixture to the boiling point and add 62.5 parts of nickel nitrate and 0.5 part of ortho-phosphoric acid dissolved in 150 parts of water. Filter the resulting mixture, wash thoroughly with distilled water and dry the material from the filter at 110° C. The dried material is formed into tablets, and reduced and employed as in Example I for the decomposition of a hydrocarbon and water vapor.

*Example VII.*—Treat granular pumice stone, preferably of 8 to 12 mesh, with hot concentrated hydrochloric acid. Wash the thus treated pumice with water until the hydrochloric acid is substantially all removed. Add 70 parts of the pumice thus treated and 10 parts of magnesia powder to 27 parts of sodium hydroxide dissolved in 500 parts of water. Bring the mixture to boiling and add 50 parts of nickel nitrate dissolved in 100 parts of water. Filter the resulting mixture. Wash the material on the filter thoroughly with distilled water and dry at 110° C. The material thus prepared is then reduced and may be employed as in Example I for the decomposition of a hydrocarbon and water vapor.

*Example VIII.*—Treat granular pumice stone, preferably of 8 to 12 mesh, in hot concentrated hydrochloric acid. Wash the thus treated pumice with water until the hydrochloric acid is substantially all removed. Add 70 parts of the pumice thus treated to 27 parts of sodium hydroxide dissolved in 500 parts of water. Bring the mixture to boiling and add 50 parts of nickel nitrate dissolved in 100 parts of water. Filter the resulting mixture. Wash the material on the filter thoroughly with distilled water and dry at 110° C. The material thus prepared is then reduced and may be employed as in Example I for the decomposition of a hydrocarbon and water vapor.

*Example IX.*—Add 75 parts of powdered calcined magnesite to 40 parts of sodium carbonate dissolved in 500 parts of water. Bring the mixture to the boiling point and add slowly with stirring a solution of 62.5 parts of nickel nitrate and 7.9 parts of aluminum nitrate (both salts on anhydrous basis) in 150 parts of water. Filter the resulting mixture and wash thoroughly with distilled water. Dry the material from the filter at 110° C. and compress into tablets. The catalyst thus prepared may be reduced and used as described in Example III.

The above examples of the new catalyst material of this invention are given by way of illustration, but it is intended that the scope of the invention be not limited to these particular examples. The catalyst materials of this invention comprise nickel precipitated in a medium containing a basic substance, such as sodium hydroxide and sodium carbonate. Other precipitants may be employed, such as potassium hydroxide or potassium carbonate. It has been found in general, that catalysts exhibiting a particularly high efficiency for the reaction of a hydrocarbon and steam, may be prepared by precipitating nickel in an aqueous medium having a pH value of about 11 or greater, and more particularly of from about 11 to about 14.

While active catalysts may be prepared in accordance with this invention which consist of nickel and a carrier such as magnesia or pumice, it may be desirable to add to the catalyst material other substances such as are considered promoters for nickel catalysts, and it is to be understood that the scope of this invention comprises such promoted catalysts. For instance, in Example IX a catalyst is prepared from a solution containing a nickel salt and an aluminum salt giving a material in the use of which the action of the nickel is considered to be aided or promoted by the aluminum present, and in Example II above, a catalyst which comprises a small amount of a chloride is particularly described in which it is believed that the chloride acts as a promoter.

This promoting action of a chloride is particularly surprising since it has heretofore been considered in the production of active catalysts adapted to the decomposition of a hydrocarbon and steam, that the halogens such as chlorine in any form must be particularly avoided both in the catalyst material itself and in the gases treated. While I have found that the amount of chlorine as well as sulfur in the gas undergoing catalysis should be strictly limited as they apparently exercise a poisoning effect upon the catalysts, on the other hand, halides, for example chloride, in the catalyst material itself in a proper concentration (0.01 to 0.1%) are beneficial. As is shown in the catalyst of Example IV, magnesium fluoride is a suitable carrier for the catalyst of this invention. Sulfates, on the other hand, in the catalyst have been found to be harmful and, accordingly, materials containing more than traces of sulfates should be avoided in the preparation of the catalysts of this invention.

The catalysts described above may be employed in any suitable manner for the decomposition of a hydrocarbon and water vapor to form hydrogen. For example, the catalyst material may be placed in a suitable vessel. A mixture of natural gas and steam is preheated to a temperature within the range of efficient operation of the catalyst, for example to a temperature of about 600° C., and then passed in direct contact with the catalyst. Hydrocarbon and steam in the gas is caused to react to produce hydrogen and carbon dioxide, together with a relatively small proportion of carbon monoxide. If desired, the gaseous products leaving the catalyst may be again heated and passed through a second body of catalyst for further treatment.

Since certain changes in carrying out the above processes both for preparing a catalyst and for the production of hydrogen employing the same, and certain modifications in the catalysts which embody the invention may be made without departing from its scope, it is intended that all matter contained in the above description shall be interpreted as illustrative and not in a limiting sense.

When in the specification and claims reference is made to nickel, it is intended thereby to refer either to the metal or to nickel in chemical combination with other elements. Thus, when it is said that a catalyst comprises precipitated nickel, it is intended to include a catalyst which contains nickel precipitated as a chemical compound of nickel. In referring to a "catalyst" or to a "catalyst material", no distinction is to be drawn as between a material which is of itself catalytically active and a material which, by change in physical form or chemical composition, becomes catalytically active. The term "catalyst" or "catalyst material" as employed in the specification and claims is intended, therefore, to refer to a material which, either with or without reduction, decomposition or reaction which occurs during its use as a catalyst, acts to catalyze the reaction between a hydrocarbon and steam to produce hydrogen.

I claim:

1. The process of producing hydrogen by passing a hydrocarbon and water vapor at an elevated temperature in contact with a catalyst material comprising nickel precipitated from a solution of a nickel salt, the precipitation of the nickel taking place in a liquid medium which contains dissolved therein an alkaline material to maintain said medium basic during said precipitation.

2. The process of producing hydrogen by passing a hydrocarbon and water vapor at an elevated temperature in contact with a catalyst material comprising a carrier and nickel precipitated thereon from a solution of a nickel salt, the precipitation of the nickel taking place in a liquid medium which contains dissolved therein an alkaline material to maintain said medium basic during said precipitation.

3. The process of producing hydrogen by passing a hydrocarbon and water vapor at an elevated temperature in contact with a catalyst material comprising magnesia and nickel precipitated thereon from a solution of nickel nitrate in an aqueous medium containing sodium hydroxide dissolved therein to maintain said medium basic during the precipitation of the nickel.

4. The process of producing hydrogen by passing a hydrocarbon and water vapor at a temperature of about 550° C. in contact with a catalyst material comprising nickel precipitated from a solution of a nickel salt, the precipitation of the nickel taking place in a liquid medium which contains dissolved therein an alkaline material to maintain said medium basic during said precipitation.

5. The process of producing hydrogen by passing a hydrocarbon and water vapor at an elevated temperature in contact with a catalyst material comprising nickel precipitated in a liquid medium which is maintained basic during the precipitation of the nickel.

6. The process of producing hydrogen by passing a hydrocarbon and water vapor at an elevated temperature in contact with a catalyst material comprising nickel precipitated in an aqueous medium in which a pH value greater than 11 is maintained during the precipitation of the nickel.

7. The process of producing hydrogen by passing a hydrocarbon and water vapor at an elevated temperature in contact with a catalyst material comprising nickel precipitated in an aqueous medium in which a pH value of from about 11 to about 14 is maintained during the precipitation of the nickel.

8. The process of producing hydrogen by passing a hydrocarbon and water vapor at an elevated temperature in contact with a catalyst material comprising nickel precipitated in an aqueous medium containing sodium hydroxide dissolved therein to maintain said medium basic during the precipitation of the nickel.

9. The process of producing hydrogen by passing a hydrocarbon and water vapor at an elevated temperature in contact with a catalyst material comprising nickel precipitated in a basic medium by introducing a solution of a nickel salt into an alkaline solution and maintaining said last mentioned solution alkaline during the precipitation of the nickel.

10. The process of producing hydrogen by passing a hydrocarbon and water vapor at an elevated temperature in contact with a catalyst material comprising nickel precipitated by introducing a solution of nickel nitrate into a solution containing sodium hydroxide dissolved therein to maintain said medium basic during the precipitation of the nickel.

11. The process of producing hydrogen by passing a hydrocarbon and water vapor at an elevated temperature in contact with a catalyst material comprising nickel precipitated in a basic medium and a halide.

12. The process of producing hydrogen by passing a hydrocarbon and water vapor at an elevated temperature in contact with a catalyst material comprising nickel precipitated in a basic medium and about 0.01 to 0.1% of a chloride.

13. The process of producing hydrogen by passing a hydrocarbon and water vapor at an elevated temperature in contact with a catalyst material comprising precipitated nickel and a small amount of a chloride.

14. The process of producing hydrogen by passing a hydrocarbon and water vapor at an elevated temperature in contact with a catalyst material comprising nickel precipitated in a basic medium by the addition of a solution of nickel chloride to a solution of a base and washing the precipitate thus obtained to remove soluble material therefrom, but discontinuing the washing while a small amount of chloride still remains in the precipitate.

FRANK PORTER.